United States Patent
Higashi et al.

(10) Patent No.: US 6,709,734 B2
(45) Date of Patent: Mar. 23, 2004

(54) RESIN SHEET, THERMOFORMED ARTICLE, AND MULTILAYER STRUCTURE

(75) Inventors: Kenichi Higashi, Sodegaura (JP); Kouichi Yanase, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/223,354

(22) Filed: Aug. 20, 2002

(65) Prior Publication Data

US 2003/0044627 A1 Mar. 6, 2003

(30) Foreign Application Priority Data

Aug. 27, 2001 (JP) ........................... 2001-255805

(51) Int. Cl.⁷ .......................... B32B 27/32; B29C 51/00
(52) U.S. Cl. ................. 428/212; 428/516; 428/520; 428/522; 428/523; 428/910; 526/238; 526/238.1
(58) Field of Search ................. 428/910, 516, 428/522, 523, 212, 520; 526/238, 238.1, 328

(56) References Cited

U.S. PATENT DOCUMENTS

| | | | | |
|---|---|---|---|---|
| 5,369,181 A | * | 11/1994 | Hwo | 525/240 |
| 6,071,598 A | * | 6/2000 | Peiffer et al. | 428/213 |
| 6,268,062 B1 | * | 7/2001 | DeMeuse | 428/461 |
| 6,391,467 B1 | * | 5/2002 | DeLisio et al. | 428/516 |

FOREIGN PATENT DOCUMENTS

| | | | |
|---|---|---|---|
| JP | 54-68864 A | | 6/1979 |
| JP | 11-172016 | * | 6/1999 |

* cited by examiner

*Primary Examiner*—D. Lawrence Tarazano
(74) *Attorney, Agent, or Firm*—Sughrue Mion, PLLC

(57) ABSTRACT

Disclosed are a resin sheet that has a resin layer which is made up of a thermoplastic resin and which has a degree of orientation of not less than 0.0002 and not more than 0.0020, and a thermoformed article and laminate structure. The resin sheet is preferably employed in a thermoforming process. Particlarly favorable application of the resin sheet is a paintless film, which is usually thermoformed and then laminated to a molten resin.

9 Claims, 1 Drawing Sheet

RESIN SHEET, THERMOFORMED ARTICLE, AND MULTILAYER STRUCTURE

BACKGROUND OF THE INVENTION

1. Field of the Invention

The present invention relates to a resin sheet suitable for use in thermoforming, and to a thermoformed article and multilayer structure which are obtained from the resin sheet.

2. Description of the Related Art

In the production of formed articles, especially injection molded articles, made of thermoplastic resin for use in the fields of automobiles and household appliances, a method for producing formed articles of excellent surface appearance includes a method comprising setting a resin sheet such as that described in WO88/07416 (this may be called a "paintless film") into a mold for molding resin and then supplying a thermoplastic resin into the mold, thereby shaping the thermoplastic resin and at the same time laminating the resin to the resin sheet. In the practice of that method, the resin sheet is often shaped into a designed form by thermoforming such as vacuum forming, etc. before its setting into the mold.

In general, the resin sheets used for such a purpose is roughly classified, in view of their production method, into those produced by cast processing (e.g., those described in WO88/07416, JP-A-11-20789, etc.) and those produced by T-die processing (e.g., those described in JP-A-10-279766). Desired are those produced by T-die processing because of costs.

Resin sheets used as paintless films usually comprise a transparent layer, a design layer and a backing layers. For the transparent layer, poly(methyl methacrylate) is often used for simultaneous achievement of highly glossy appearance and high scratch resistance. Use of polyolefin resins, which are less expensive than poly(methyl methacrylate) and are of good recyclability, have also been demanded recently.

However, the conventional resin sheets produced by T-die processing from poly(methyl methacrylate), polyolefin resins or the like have a problem in that minute irregularities are formed in their surfaces after their thermoforming. Under such circumstances, the object of the present invention is to provide a resin sheet in a surface of which no minute irregularities are formed during or after its thermoforming and which is easy to handle during its thermoforming, and to provide a thermoformed article and multilayer structure having no minute irregularities in surfaces thereof.

SUMMARY OF THE INVENTION

The aforementioned object has been attained mainly by the following creations (1), (2) and (3):

(1) A resin sheet comprising a resin layer that comprises a thermoplastic resin and that has a degree of orientation of not less than 0.0002 and not more than 0.0020.

(2) A thermoformed article which is obtained by thermoforming the resin sheet according to item (1).

(3) A multilayer structure comprising a thermoformed article and a substrate multilayerd to the thermoformed article, the thermoformed article being obtained by thermoforming the resin sheet according to item (1) and the substrate comprising a thermoplastic resin.

A film and a sheet are generally distinguished from one another base on their thickness. However, in the present invention, films and sheets are defined generically as "sheets".

DETAILED DESCRIPTION OF THE INVENTION

Figure 1:
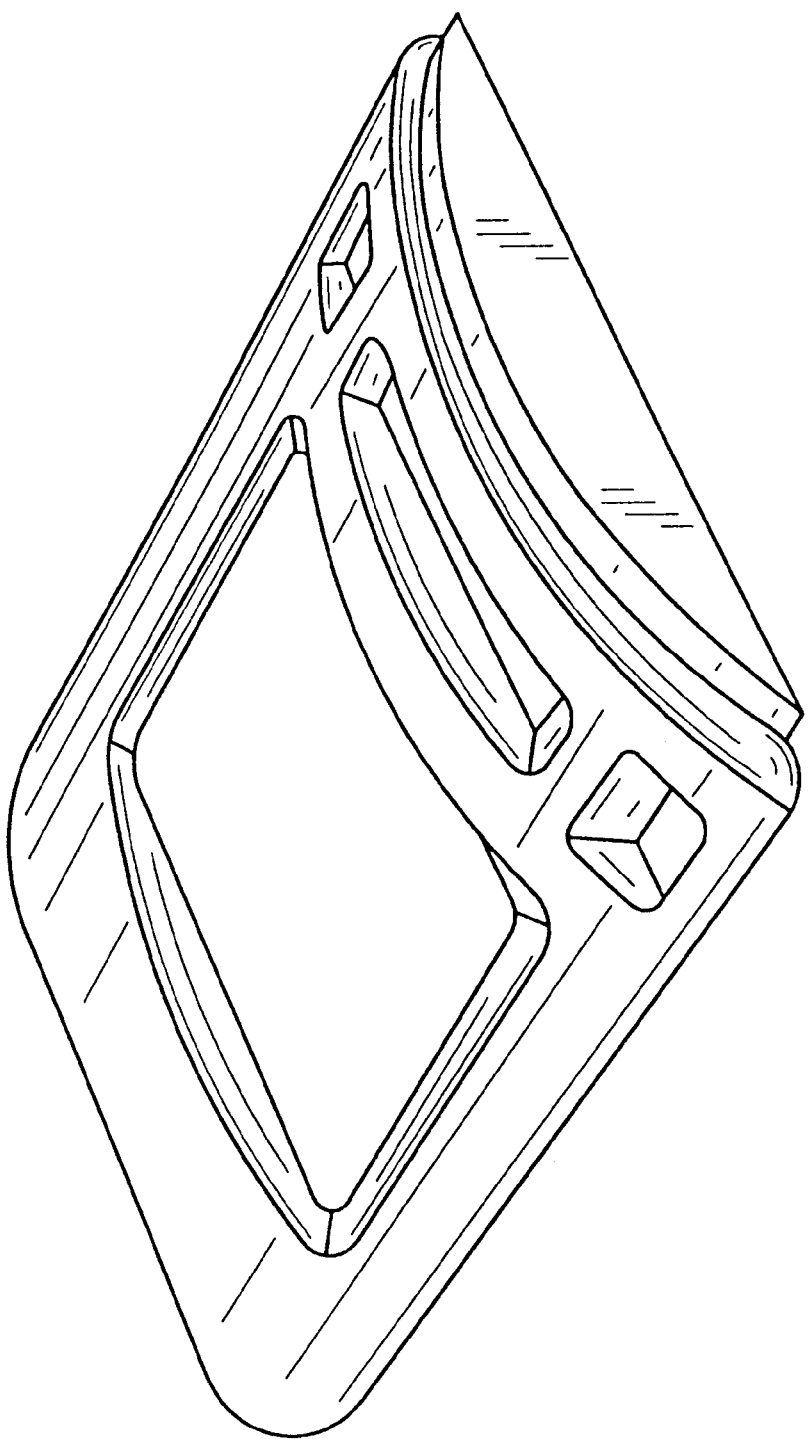
FIG. 1 is a perspective view of a mold for thermoforming used in Examples.

The resin sheet of the present invention is a resin sheet that has a resin layer which comprises a thermoplastic resin and which has a degree of orientation of not less than 0.0002 and not more than 0.0020. Such a resin sheet can suitably be employed for thermoforming. In the present invention, the degree of orientation of a resin layer comprising a thermoplastic resin is defined as the absolute value of the difference between (i) a refractive index of the resin layer along a direction which is perpendicular to the thickness direction of the resin layer, the refractive index being the largest one of the refractive indexes along all the directions perpendicular to the thickness direction, and (ii) a refractive index of the resin layer along a direction which is perpendicular to both the thickness direction and the direction along which the refractive index (i) is detected.

The resin sheet of the present invention can be obtained via a take-off process performed under conditions carefully selected but not usually empoloyed in processes for forming resin sheets. In a resin sheet containing a thermoplastic resin layer obtained via a take-off process, the largest refractive index of the resin layer is naturally achieved in the direction along which the resin sheet was taken-off. The direction along which the resin sheet was taken-off is generally called the machine direction, which is abbreviated MD. Therefore, in a resin sheet obtained via a take-off process, the degree of orientation is the absolute value of the difference between the refractive index, $n_x$, in the MD and the refractive index, $n_y$, in the direction perpendicular to the MD (this direction is referred to as TD). These refractive indexes are determined through measurement of double refraction index of the resin sheet. The degree of orientation of the resin layer comprising a thermoplastic resin is not less than 0.0002 and not more than 0.0020. If a resin sheet contains no resin layer having a degree of orientation of not less than 0.0002 and not more than 0.0020 and has a resin layer having a degree of orientation greater than 0.0020, a molded article obtained by thermoforming of the resin sheet tends to be deteriorated in its surface appearance due to formation of minute irregularities in a surface of the formed article. On the other hand, if a resin sheet contains no resin layer having a degree of orientation of not less than 0.0002 and not more than 0.0020 and has only a resin layer having a degree of orientation less than 0.0002, the resin sheet tends to cause apparent drawdown during its thermoforming and therefore has a poor thermoformability. The degree of orientation is preferably not less than 0.0003 and not more than 0.0020, still more preferably not less than 0.0003 and not more than 0.0018.

The thermoplastic resin that forms the resin layer having a degree of orientation of not less than 0.0002 and not more than 0.0020 in the resin sheet of the present invention, is not particularly restricted. However, of thermoplastic resins, preferred are polyolefin resin and acrylic resin. The polyolefin resin is a thermoplastic resin obtained by addition polymerization of olefin and is exemplified by propylene polymers, ethylene polymers and 1-butene polymers. Preferred are propylene polymers. The propylene polymers referred to herein are polymers obtained by polymerizing propylene. Preferred are propylene homopolymer resins, or copolymer resins made up of propylene and α-olefin having from 2 to 12 carbon atoms other than propylene in an amount such that crystallinity is not lost, or a plurality of resins selected from those polymers and copolymers.

Examples of the α-olefin include ethylene, 1-butene, 4-methyl-1-pentene, 1-hexene and 1-octene. In the case of copolymers, the content of repeat units derived from monomers other than propylene is preferably not more than 10% by weight when α-olefin is ethylene, or not more than 30% by weight when α-olefin is an α-olefin having from 4 to 12 carbon atoms. Of the propylene polymers, more preferred are propylene homopolymers, and still more preferred are propylene homopolymers with an isotactic pentad fraction of not smaller than 0.95. Particularly preferred are propylene homopolymers with an isotactic pentad fraction of not smaller than 0.97.

The process for producing the propylene polymers is not particularly restricted and may be gas phase polymerization, solvent polymerization, and the like. Particularly preferred is gas phase polymerization. Various kinds of known catalysts can be employed as a catalyst for polymerization. Preferred examples include multisite catalysts obtained by use of a solid catalyst component containing a titanium atom, a magnesium atom and a halogen atom, or single site catalysts obtained by use of a metallocene complex or the like.

The resin layer having a degree of orientation of not less than 0.0002 and not more than 0.0020 in the resin sheet of the present invention can be formed, for example, by a production process comprising a step of melt kneading a thermoplastic resin in an extruder, a step of extruding the molten matter through a die lip, and a step of cooling and solidifying the extrudate with a cooling roll, thereby forming a film, wherein the temperature of the molten matter applied at its extrusion from the die lip is made higher than that usually employed and wherein used as the cooling roll is a roll for forming a thin film such as that described in, for example WO97/28950, namely a so-called Flex Roll, comprising a metallic elastic outer cylinder made of a thin metal film that can be elastically deformed and a shaft that clogs both ends of the metallic elastic outer cylinder.

Examples of a device for producing the resin sheet of the present invention include known T-die film processing devices, known extrusion lamination processing devices and known T-die sheet forming devices. Of these devices, preferred are the T-die film processing devices. The cooling roll cools a molten resin by pinching both surfaces thereof between the surfaces of a pair of cooling rolls. The aforementioned Flex Roll is a roll for forming a thin film, the roll comprising a metallic elastic outer cylinder made of a thin metal film that can be elastically deformed and a shaft that clogs both ends of the metallic elastic outer cylinder. The Flex Roll is described in detail, for example, in the specification of WO97/28950. A suitable temperature of a molten matter of the aforementioned resin at the time of its extrusion through a die lip depends on the kind of the resin used and the thickness of the sheet to be formed, but is usually within the range of from 210° C. to 280° C., preferably from 220° C. to 270° C.

The resin sheet of the present invention is made of the aforementioned thermoplastic resin. The resin sheet may have a single layer. Alternatively, it may be a multilayer sheet containing at least one layer of the aforementioned thermoplastic resin. When the resin sheet is a multilayer sheet, it preferably has the aforementioned specific thermoplastic resin layer as an outermost layer thereof. In such a case, both outermost layers of the multilayer sheet may be layers of the aforementioned thermoplastic resin. However, taking the usage pattern of the resin sheet in which the sheet is, after its thermoforming, multilayerd to a substrate of thermoplastic resin into consideration, it is preferable that only one outermost layer is a layer of the aforementioned thermoplastic resin.

When the resin sheet of the present invention is a monolayer sheet consisting of the aforementioned resin layer or a multilayer sheet comprising the aforementioned resin layer that forms a surface of the sheet, those resin layers preferably have a total haze of not greater than 10%, more preferably not greater than 5%. A layer that forms a surface of a resin sheet of the present invention, for example, a transparent surface layer, preferably has a surface roughness of not greater than 2 μm, more preferably not greater than 1 μm. This is because when a thermoformed article obtained by thermoforming a resin sheet having such a surface layer so that the surface layer of the resin sheet forms a surface of the thermoformed article or a multilayerd molded article obtained by molding a thermoplastic resin to form a substrate and simultaneously laminating the resin sheet to the surface of the substrate so that the surface layer of the resin sheet forms a surface of the multilayerd molded article has highly glossy appearance or a design layer, the gloss or design will be seen with good deep feeling. In the present invention, a surface roughness is expressed by a centerline average roughness (Ra) provided in JIS B0601.

When the resin sheet is a multilayer sheet having at least one layer in addition to the resin layer, the total haze of the resin layer is determined by preparing a single layer sheet comprising only the resin layer according to the method for producing the multilayer sheet except for forming no layers other than the resin layer, and measureing the total haze of the single layer sheet. Alternatively, the total haze can be determined by peeling off the resin layer from the multilayer sheet and measuring the total haze of the resin layer peeled.

When the resin sheet of the present invention is a multilayer sheet, preferred embodiments thereof include a multilayer sheet comprising a transparent layer and a design layer and/or a backing layer wherein the transparent layer forms a surface of the sheet, and the desinged layer, the backing layer, or both the design layer and the backing layer have a degree of orientation of not less than 0.0002 and not more than 0.0020. Such an embodiment is preferable because the effect of preventing the occurrence of minute irregularities in a surface of thermoformed article can be achieved.

In the above-mentioned multilayer sheet comprising a transparent layer and a design layer and/or a backing layer wherein the transparent layer forms a surface of the sheet and the desinged layer, the backing layer, or both the design layer and the backing layer have a degree of orientation of not less than 0.0002 and not more than 0.0020, the transparent layer preferably has a surface roughness of not greater than 2 μm, more preferably not greater than 1 μm. A transparent layer having such a surface roughness can be formed, for example, by the following methods. For a transparent layer of a polyolefin resin, the layer can be formed by use of a known T-die processing device and a Flex Roll as a cooling roll. For a transparent layer of an acrylic resin, it can be formed by use of a T-die processing device equipped with two cooling roll. In the production, a sheet-like resin extruded is pressed from its both sides between the two cooling rolls.

When the resin sheet of the present invention is a multilayer sheet, the process for producing such a multilayer sheet is roughly classified into two groups. A first group comprises a process comprising a step of forming a thermoplastic resin layer having a degree of orientation falling within the aforementioned range and a step of laminating the resulting thermoplastic resin layer with other layers by a proper method. Examples of the method for the lamination include melt lamination in which a molten resin is put in layer on the thermoplastic resin layer and then the layers piled are pressed to laminate together, and dry lamination in which layers including the thermoplastic resin layer, separately prepared, are laminated together by using an adhesive or by heating. A second group comprises a process in which a multilayer sheet is formed, for example, by multilayer extrusion to form a multilayer sheet containing the thermoplastic resin having a degree of orientation falling within the aforementioned range and then, if needed, taking-off the multilayer sheet extruded.

A thermoformed article is obtained by thermoforming the resin sheet of the present invention. Such a thermoformed article is suitably employed as a decorative sheet for achieving good appearance by laminating it to a substrate of a thermoplastic resin. For example, lamination of a thermoformed article prepared from a resin sheet consisting only of a highly transparent layer of the aforementioned thermoplastic resin to a colored substrate makes the color of the substrate be of deep feeling. When preparing a thermoformed article by thermoforming of a resin sheet in which a highly transparent layer of the aforementioned thermoplastic resin and a design layer with a design such as coloring or print and subsequently laminating the thermoformed article to a substrate, the substrate is provided with a good surface appearance or the substrate is decorated and the design is provided with a deep feeling.

The resin sheet of the present invention preferably has the aforementioned resin layer and a design layer laminated to the resin layer. Preferred examples of such a resin sheet include a multilayer sheet consisting of two layer, namely, a transparent layer and a print or colored layer, a multilayer sheet comprising a transparent layer, a print layer and a colored layer, and a multilayer sheet comprising a transparent layer, a print layer and/or a colored layer and a backing layer. In the above embodiments, the transparent layer are the resin layer having a degree of orientation falling within the aforementioned range.

The laminate structure of the present invention is that obtained by laminating the aforementioned thermoformed article and a substrate made of a thermoplastic resin. Any known thermoplastic resin may be employed as the thermoplastic resin for the substrate. However, preferably employed are thermoplastic resins employed in the fields of automobiles and household appliances. Crystalline olefin polymer resins are more preferably empolyed.

The crystalline olefin polymer resins are resins which can be obtained from olefin polymers with crystallinity. Examples thereof include propylene polymers, ethylene polymers and 1-butene polymers. Preferred are propylene polymers. The propylene polymers referred to herein are polymers obtained by polymerizing propylene and include propylene homopolymers and copolymers obtained by copolymerizing propylene and other comonomers (e.g., ethylene and 1-butene). Usually employed are random copolymers or block copolymers Propylene homopolymers are more preferably employed as the crystalline olefin polymer resin. Propylene homopolymers more preferably have an isotactic pentad fraction of not less than 0.95, still more preferably of not less than 0.97.

The resins for a substrate are preferably those which can be well adhered to the aforementioned thermoformed article, and more preferably those which can be adhered to the thermoformed article by melt adhesion. From the viewpoint of adhesiveness between a thermoformed article and a substrate, the resin for the substrate and the resin of the surface of the thermoformed article which will be adhered to the substrate are preferably of the same or similar type.

The production of the laminate structure of the present invention may be performed in any way. For example, a process comprising the following steps (1) through (4) can be employed:

(1) A step of heating the aforementioned resin sheet to soften it.

(2) A step of thermoforming the softened resin sheet with a mold for thermoforming, thereby obtaining a thermoformed article.

(3) A step of setting the thermoformed article to a cavity die of a mold for molding.

(4) A step of supplying a molten thermoplastic resin into the mold containing the thermoformed article, thereby obtaining a laminate structure comprised of a substrate molded from the resin supplied and the thermoformed article laminated to the substrate.

The thermoforming method relating to steps (1) and (2) includes vacuum forming, air pressure forming, vacuum-pressure forming, and the like. In the case where the resin sheet contains a polyolefin resin as its constituent, for obtaining a thermoformed article excellent in transparency, it is preferable to set the temperature applied to the resin sheet during the thermoforming as low as possible.

A mold for use in the thermoforming may be made of metal, resin, wood, paper or the like. Metal is preferred. The inner surface of the mold is preferably smooth. The mold for thermoforming preferably has a surface roughness (Ra) of 0.1 $\mu$m or less, more preferably 0.08 $\mu$m or less, and still more preferably 0.06 $\mu$m or less as measured according to JIS B0601.

Further, the resin sheet is preferably cooled rapidly after being shaped through its contact to a mold for thermoforming. For this purpose, the temperature of the mold for thermoforming is preferably maintained within the range of from 10 to 50° C., more preferably from 20 to 30° C. It is preferable to cool the shaped resin sheet rapidly by bringing the resin sheet into contact with a fluid of a lower temperature. For example, the temperature of the fluid is preferably from 10 to 20° C. Preferred examples of the fluid include air and water.

The molding method relating to step (4) includes injection molding, injection compression molding, injection press molding, and the like. The temperature of the resin to be injected in that step is usually not lower than the melting point of the resin, and preferably 200° C. or higher. The temperature of the mold employed in that step is usually from 20 to 60° C., preferably from 30 to 40° C. The die preferably has a smooth surface. The surface roughness (Ra) is preferably 0.1 $\mu$m or less, more preferably 0.08 $\mu$m or less, and still more preferably 0.06 $\mu$m or less.

Steps (1) through (4) can be performed in one step. For example, the thermoject process can be employed.

The laminate structure of the present invention, especially those obtained by laminating a multilayer thermoformed article comprising a decorated sheet such as a colored sheet, a grain-patterned sheet, a metallic sheet and a carbon tone sheet, to a substrate can be suitably used as automotive parts (interior or exterior parts) such as center clusters. Those are also suitable for applications, e.g., parts of household appliances, parts of sundry goods, sign boards, etc.

The various kinds of thermoplastic resins to be employed in the present invention may, as required, be used in combination with various kinds of additives. Examples of such additives include antioxidants, stabilizers, antistatic agents, nucleating agents, adhesives and antifogging agents.

The thickness of the resin sheet of the present invention is usually from 5 to 800 $\mu$m, preferably from 50 to 500 $\mu$m.

The present invention will be further described based on examples below. However, the invention is not restricted to the examples.

In the examples, the physical properties were determined in the following methods.

1. Degree of Orientation ($n_x$-$n_y$) The degree of orientation was measured by determining the difference between the refractive index of a resin sheet in MD, $n_x$, and the refractive index of the resin sheet in TD, $n_y$, with a three-dimension double refraction measuring device OPT1PHOT2-POL (manufactured by Nikon Corp.)

2. Haze

The haze was measured according to JIS K7105.

3. Evaluation of Thermoformed Article

The appearance of a thermoformed article was observed visually and evaluated as follows:

(1) Surface condition: If minute irregularities were formed in a surface of a thermoformed article, the surface condition of the article was judged to be poor.

(2) Thermoformability: If a breakage was formed in a resin sheet or a resin sheet was not shaped into a configuration of a mold for thermoforming, the thermoformability of the resin sheet was judged to be poor.

4. Pencil Hardness

The measurement of pencil hardness was performed according to the pencil scratch test provided in JIS K5400. In the evaluation, a test was first performed using a pencil being of hardness 6B and then the hardness of pencils was increased to be 5B, 4B, . . . in sequence. The pencil hardness was expressed in hardness of a pencil with which a sample was damaged first in its surface.

5. Surface Roughness.

The surface roughness of an article (Ra) was measured according to JIS B0601.

EXAMPLE 1

A propylene polymer consisting of 100 parts by weight of a propylene homopolymer and 0.3 part by weight of a nucleating agent [2,2-methylenebis(4,6-di-tert-butylphenyl) sodium phosphate, ADEKA STAB NA-21 (commercial name), manufactured by Asahi Denka Co., Ltd.] was formed into a sheet with a T-die film forming machine (die width: 600 mm) under conditions as follows, thereby yielding a resin sheet having a thickness of 0.1 mm, a degree of orientation, $n_x-n_y$, of 0.0017, a total haze of 5%, and a surface roughness (Ra) of 0.03 μm.

| | |
|---|---|
| Cylinder temperature: | 239° C. |
| Extrusion speed: | 16 kg/hr |
| Take-off speed: | 5.4 m/min |
| Temperature of mirror-finished roll: | 20° C. |
| Temperature of Flex Roll (manufactured by CBC Tech Co., Ltd.): | 20° C. |

The propylene homopolymer had an MFR (melt flow rate) of 8.0 g/10 min and an isotactic pentad fraction of 0.97.

The resulting sheet was heated and softened at a surface temperature of 153° C. using a far infrared radiation heater. The softened sheet was brought into contact with a surface of a mold for thermoforming to be thermoformed. The results of evaluation are shown in Table 1.

EXAMPLE 2

The propylene polymer the same as that used in Example 1 was formed into a sheet using a T-die film forming machine (T-die width: 600 mm) under the following conditions, thereby yielding a resin sheet having a thickness of 0.2 mm, a degree of orientation, $n_x-n_y$, of 0.00038, a total haze of 3.9%, and a surface roughness (Ra) of 0.03 μm.

| | |
|---|---|
| Cylinder temperature: | 220° C. |
| Extrusion speed: | 73 kg/hr |
| Take-off speed: | 12 m/min |
| Temperature of mirror-finished roll: | 20° C. |
| Temperature of Flex Roll (manufactured by CBC Tech Co., Ltd.): | 22° C. |

The resulting resin sheet was thermoformed and then evaluated. The results are shown in Table 1.

COMPARATIVE EXAMPLE 1

The propylene polymer the same as that used in Example 1 was formed into a sheet using a T-die film forming machine (T-die width: 600 mm) under the following conditions, thereby yielding a resin sheet having a thickness of 0.1 mm, a degree of orientation, $n_x-n_y$, of 0.0021, a total haze of 5%, and a surface roughness (Ra) of 0.03 μm.

| | |
|---|---|
| Cylinder temperature: | 200° C. |
| Extrusion speed: | 73 kg/hr |
| Take-off speed: | 12 m/min |
| Temperature of mirror-finished roll: | 20° C. |
| Temperature of Flex Roll (manufactured by CBC Tech Co., Ltd.): | 22° C. |

The resulting resin sheet was thermoformed and then evaluated. The results are shown in Table 1.

COMPARATIVE EXAMPLE 2

The propylene polymer the same as that used in Example 1 was formed into a sheet using a T-die film forming machine (T-die width: 600 mm) under the following conditions, thereby yielding a resin sheet having a thickness of 0.2 mm, a degree of orientation, $n_x-n_y$, of 0.00017, a total haze of 5.2%, and a surface roughness (Ra) of 0.03 μm.

| | |
|---|---|
| Cylinder temperature: | 239° C. |
| Extrusion speed: | 13 kg/hr |
| Take-off speed: | 3 m/min |
| Temperature of mirror-finished roll: | 20° C. |
| Temperature of Flex Roll (manufactured by CBC Tech Co., Ltd.): | 20° C. |

The resulting resin sheet was thermoformed and then evaluated. The results are shown in Table 1.

TABLE 1

| | Example 1 | Example 2 | Comparative Example 1 | Comparative Example 2 |
|---|---|---|---|---|
| <Evaluation of resin sheet> | | | | |
| Degree of Orientation | 0.0017 | 0.00038 | 0.0021 | 0.00017 |
| Haze (%) | 5 | 3.9 | 5 | 5.2 |
| Pencil hardness | HB | HB | HB | HB |
| <Evaluation of thermoformed article> | | | | |
| Surface condition | Good | Good | Poor | Poor |
| Thermoformability | Good | Good | Good | Poor (Apparent draw-down) |

EXAMPLE 3

First, an acrylic resin sheet was prepared by extruding an acrylic resin with a T-die processing device (cylinder temperature: 260° C.), followed by pressing and cooling the extrudate with a set of forming rolls containing three polishing rolls (roll temperature: 70° C.) in such a manner that a first and second rolls were kept in contact with the extrudate from both sides thereof. The acrylic resin was produced by bulk polymerization and had a reduced viscosity of 0.08 L/g, a methyl methacrylate unit content of 94% by weight and a methyl acrylate unit content of 6% by weight. The resulting acrylic resin sheet had a thickness of 125 μm, a total haze of 1.5%, and a surface roughness (Ra) of 0.005 μm.

A multilayer sheet was then prepared by lamination of the above-obtained acrylic resin sheet used for forming a transparent surface layer and a 0.1 mm thick sheet prepared in Example 1, the sheet being used for forming a backing layer. Both sheets were laminated by applying an adhesive therebetween. The adhesive was obtained by mixing 100 parts by weight of a polyurethane adhesive TKS3989, manufactured by Toyo Morton, Ltd, and 4 parts by weight of a isocyanate hardener CAT-RT, manufactured by Toyo Morton, Ltd. and diluting the mixture with toluene so as to make an application quantity of 7 g/m². The multilayer sheet obtained was heated so that the surface temperature thereof reached 180° C., thereby being softened. Thermoforming was carried out in the same manner as Example 1, yielding a thermoformed article. The resulting thermoformed article was visually judged for its appearance and was evaluated for its thermoformability and surface condition. The results are given in Table 2.

COMPARATIVE EXAMPLE 3

A multilayer sheet was prepared in the same manner as Example 3 except for using a sheet prepared in Comparative Example 1 as a backing layer. Thermoforming of the multilayer sheet was carried out in the same manner as Example 3, yielding a thermoformed article. The results of the evaluation of the thermoformed article are given in Table 2.

TABLE 2

|  | Example 3 | Comparative Example 3 |
| --- | --- | --- |
| Degree of orientation of backing layer | 0.0017 | 0.0021 |
| <Evaluation of resin sheet> | | |
| Pencil hardness | 2H | 2H |
| <Evaluation of thermoformed article> | | |
| Surface condition | Good | Poor |
| Thermoformability | Good | Good |

The present invention can provide a resin sheet suitable for thermoforming that forms no minute irregularities in its surface after its thermoforming. The invention also can provide a thermoformed article and a laminate structure with no minute irregularities in their surfaces. In particular, thanks for the small degree of orientatioin of the thermoplastic resin layer in the resin sheet of the present invention, the resin sheet hardly causes minute irregularities in its surface even if it receives pressure while being heated and it hardly causes draw-down even if it is heated. By use of such characteristics of the resin sheet of the present invention, the resin sheet can suitably be employed in thermoforming. A paintless film, which is usually used in a manner such that it is thermoformed and then laminated to a molten resin in a mold, is a favorable application of a resin sheet of the present invention which contains a design or colored layer laminated onto the thermoplastic resin layer.

What is claimed is:

1. A resin sheet comprising a resin layer that comprises a thermoplastic resin and has a degree of orientation of not less than 0.0002 and not more than 0.0020.

2. The resin sheet according to claim 1, wherein the resin sheet is a monolayer sheet consisting of the resin layer recited in claim 1 and the resin layer has a total haze of not greater than 10%.

3. The resin sheet according to claim 1, wherein the resin sheet is a multilayer sheet comprising the resin layer recited in claim 1 and the resin layer forms a surface of the resin sheet.

4. The resin sheet according to claim 1, wherein a design layer is laminated to the resin layer.

5. A thermoformed article which is obtained by thermoforming the resin sheet according to any one of claims 1 to 4.

6. A laminate structure comprising a thermoformed article and a substrate laminated to the thermoformed article, the thermoformed article being obtained by thermoforming the resin sheet according to any one of claims 1 to 4 and the substrate comprising a thermoplastic resin.

7. The laminate structure according to claim 6, wherein the theremoplastic resin forming the substrate is a crystalline olefin polymer resin.

8. An automotive part comprising a laminate structure comprising a thermoformed article and a substrate laminated to the thermoformed article, the thermoformed article being obtained by thermoforming the resin sheet according to any one of claims 1 to 4 and the substrate comprising a thermoplastic resin.

9. A part of household appliances, the part comprising a laminate structure comprising a thermoformed article and a substrate laminated to the thermoformed article, the thermoformed article being obtained by thermoforming the resin sheet according to any one of claims 1 to 4 and the substrate comprising a thermoplastic resin.

* * * * *